United States Patent [19]
Caicedo, Jr. et al.

[11] Patent Number: 5,257,091
[45] Date of Patent: Oct. 26, 1993

[54] OPTICAL ALIGNMENT SYSTEM FOR ALIGNING A MULTIPLE GAP TAPE HEAD ASSEMBLY

[75] Inventors: Gustavo Caicedo, Jr., Westminster; Scott L. Hanson, Costa Mesa, both of Calif.

[73] Assignee: Archive Corporation, Costa Mesa, Calif.

[21] Appl. No.: 837,728

[22] Filed: Feb. 19, 1992

[51] Int. Cl.$^5$ ............................................. G01B 11/14
[52] U.S. Cl. ..................... 356/358; 356/399; 356/400; 356/401; 356/363; 360/125; 360/137; 250/561; 33/276
[58] Field of Search ............... 356/358, 399, 400, 401, 356/363; 360/125, 137, 109, 104; 250/561; 33/276

[56] References Cited

U.S. PATENT DOCUMENTS 4,537,509  8/1985  Kronfeld ............................. 356/399

Primary Examiner—Samuel A. Turner
Assistant Examiner—LaCharles P. Keesee, II
Attorney, Agent, or Firm—Roberts and Quiogue

[57] ABSTRACT

An optical alignment system for aligning a multiple gap tape head assembly of a tape drive, including a cartridge plate insertable in a tape drive and having a first surface mirror that is parallel to a reference plane for the drive when the plate is inserted in the drive, a microscope objective imaging lens for providing images of the head gaps of the tape head assembly, a video camera and display for providing an operator viewable display of the output of the imaging lens, translation apparatus for moving the imaging lens, and an interferometer cooperating with the first surface mirror for maintaining the imaging lens at a constant distance relative to the first surface mirror as the translation apparatus moves the imaging lens from one head gap to another, such that the imaging lens moves in a plane parallel to the reference plane for the drive. By maintaining the imaging lens at a constant distance relative to the first surface mirror reflecting surface, as the imaging lens is moved from one head gap to another, the misalignment of a tape head assembly can be detected and corrected by an operator by reference to the images of the head gaps which are displayed with a reticle that is at a fixed location in the field of view of the imaging lens.

10 Claims, 5 Drawing Sheets

OPTICAL ALIGNMENT SYSTEM FOR ALIGNING A MULTIPLE GAP TAPE HEAD ASSEMBLY

BACKGROUND OF THE INVENTION

The disclosed invention is directed generally to an optical alignment system, and more particularly to an optical alignment system for optically aligning the tape head assembly of a computer tape cartridge drive by non-contactive optical gauging.

Computer data tape drives have been utilized for many years in the computer environment for "secondary" storage by which computer data on "primary" storage such as magnetic disk systems could be periodically backed up or transported.

The tape media for the tape cartridge drives is packaged in relatively small tape cartridges, and the write and read heads for a tape cartridge drive are typically contained in a unitary tape head assembly. For accurate recording and reading, it is important that the tape head gaps for a given track be parallel to the tape movement direction and, in accordance with industry standards, a tape cartridge includes reference surfaces that engage fixed position locators in a tape drive intended to receive the cartridge. The fixed position locators define reference planes, and the write and read head gaps must be aligned with a particular reference plane for proper operation.

Tape head assembly alignment has been previously achieved with an alignment system that includes a video microscope mounted on a computer controlled XYZ translation assembly and a reference plate that is configured to position a drive being aligned so that a reference or datum plane defined by certain fixed position locators in the drive is orthogonal to one of the translation axes, for example the Z axis.

The reference plate can be configured to resemble a tape cartridge, for example, and the alignment system is calibrated with a calibration block that represents an ideally aligned tape drive. Calibration is achieved by moving the microscope objective lens so as to superimpose a reticle over each of the scribed cross-hairs on the calibration block which represent ideal tape head gaps that are at the same distance from the reference plane defined by the fixed reference locators, which would be along the Z axis for the example of a reference plane that is orthogonal to the Z axis. The positions of the translation stages at which the reticle is superimposed over the scribed cross-hairs are stored, and the XYZ offsets between the two locations are determined and stored for later use. For alignment, a tape drive is locked onto the reference plate, and the microscope objective lens is moved between two viewing positions for respectively viewing two head gaps whose positions are intended to correspond to the ideal head gap positions represented by the calibration block. The tape head assembly is adjusted so that both gaps are at the same distance from the reference plane, which may involve iterative adjustment and movement of the microscope lens between the two head gaps.

A consideration with the foregoing alignment system is the physical attachment of the reference plate to the alignment system, which may make it incapable of being used with self-loading tape drives wherein the tape cartridge is moved in a plurality of directions for loading. A further consideration with the foregoing alignment system is the necessity of frequent calibration, and the requirement of precise parallelism between the reference plane as defined by the reference plate and one of the translation planes of the translation assembly.

SUMMARY OF THE INVENTION

It would therefore be an advantage to provide an improved tape head assembly alignment system that does not utilize a fixed reference plate.

Another advantage would be to provide an improved tape head assembly alignment system that optically detects a reference plane that serves as a reference for tape head assembly alignment.

A further advantage would be to provide an improved tape head assembly alignment system that optically detects a reference plane that serves as a reference for tape head assembly alignment while tape head assembly alignment is taking place.

The foregoing and other advantages are provided by the invention in an optical alignment system that includes a cartridge plate insertable in a tape drive and having a first surface mirror whose reflecting surface is parallel to a reference plane when the plate is inserted in the drive, an imaging lens for providing images of the tape head gaps of the tape head assembly of the tape drive, a video camera and display for providing an operator viewable display of the output of the imaging lens, translation apparatus for moving the imaging lens, and an interferometer cooperating with the first surface mirror for maintaining the imaging lens at a constant distance relative to the reflecting surface of the first surface mirror as the translation apparatus moves the imaging lens from one head gap to another, whereby the imaging lens moves in a plane that is parallel to the plane of the first surface mirror reflecting surface. By maintaining the imaging lens at a constant distance relative to the first surface mirror reflecting surface, which is parallel to the reference plane, as the imaging lens is moved from one head gap to another, the misalignment of a tape head assembly can be detected and corrected by an operator by reference to the images of the head gaps which are displayed with a reticle that is at a fixed location in the field of view of the imaging lens.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
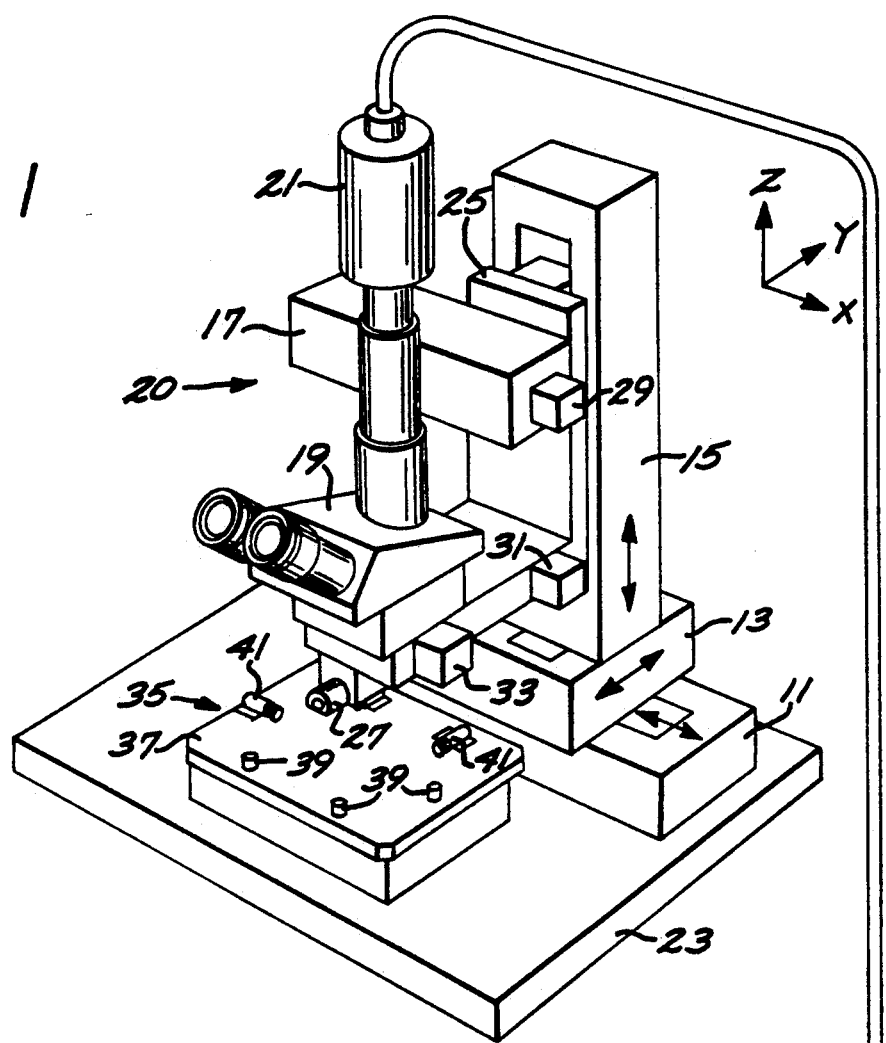
FIG. 1 a schematic perspective view of the major components of the an optical alignment system in accordance with the invention.

In the following detailed description and in the several figures of the drawing, like elements are identified with like reference numerals.

The disclosed invention is generally directed to optical alignment apparatus for aligning the write and read head gaps of a tape head assembly of a tape cartridge drive relative to a datum plane that is defined, for example by the American National Standards Institute (ANSI), for the tape cartridge which the tape drive accepts. For example, such datum plane is parallel to the intended direction of tape motion, and alignment of the tape head gaps to be equidistant from such datum plane will align the head gaps with the intended direction of tape motion.

Referring now to FIG. 1, set forth therein is an isometric view of an optical alignment system in accordance with the invention. The optical alignment system includes motorized translation stages 11, 13, 15 which provide for translation along X, Y, and Z axes of an interferometer/-microscope assembly 20 that includes a laser interferometer 17, a microscope 19 having a video camera 21 attached thereto, and a support structure 25. A video monitor 22 receives the output of the video camera 21 and provides an operator viewable display of the images provided by the microscope 19. For ease of reference, FIG. 1 and other figures include labelled axes which are helpful in describing the structure and operation of the optical alignment system.

The translation stage is fixedly secured to a stable base 23 comprising for example a granite block, and provides for translation along the X-axis of the translation stage 13. The translation stage 13 provides for translation along the Y-axis of the translation stage 15. The translation stage 15 provides for translation along the Z-axis of the support structure 25 which supports the interferometer 17 and the microscope 19. The interferometer 17 and the microscope 19 are fixedly secured to the support structure 25 such that the interferometer/-microscope assembly 20 moves as one unit.

For convenience of implementation, the translation stages 11, 13, 15 are configured such that the X and Y axes are close to being parallel to the plane of the top surface of the base 23, and the Z axis is close to being orthogonal to the top surface of the base 23.

Figure 2:
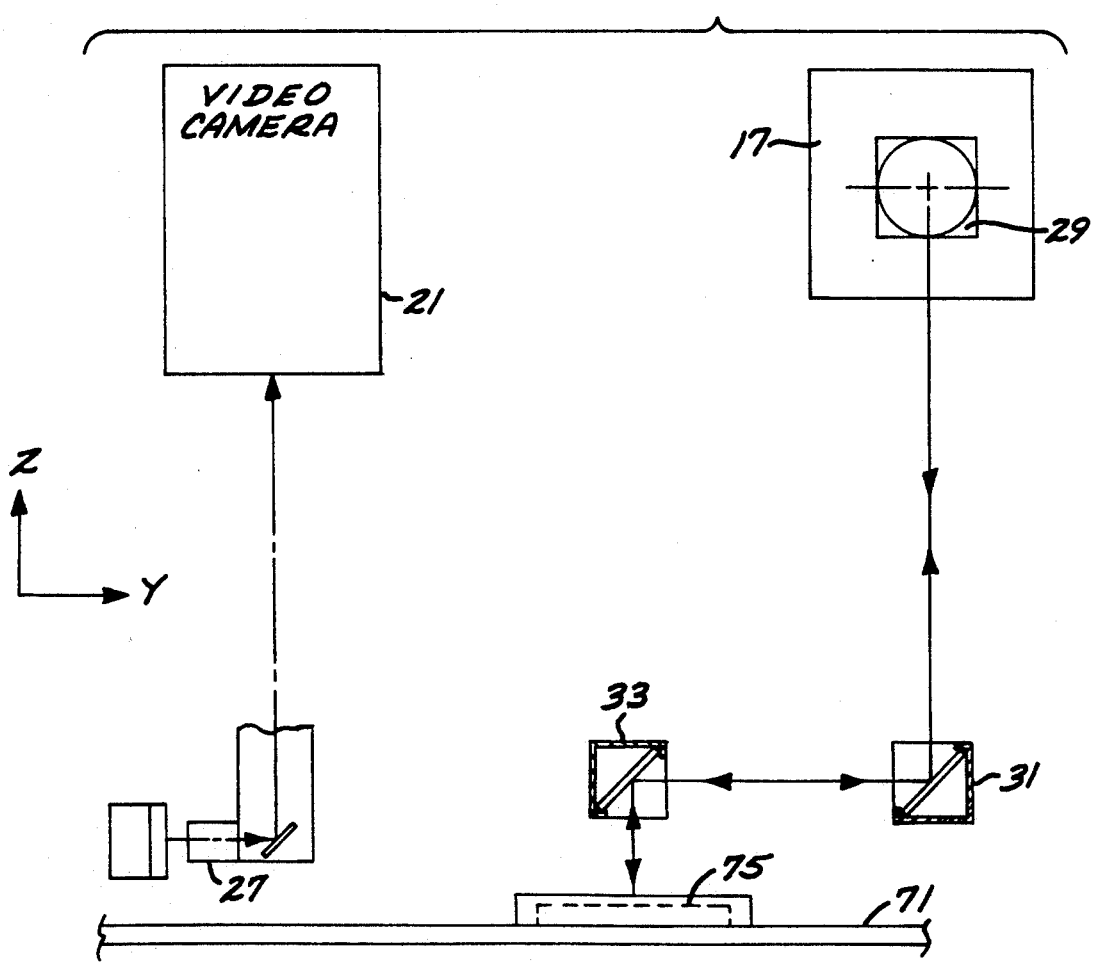
FIG. 2 schematically illustrates the optical path of the imaging illumination for the microscope of the optical alignment system of FIG. 1, and the optical path of the laser illumination for the interferometer of the optical alignment system of FIG. 1.

Referring now to FIG. 2, the microscope 19 includes a right angle objective lens 27 having a viewing direction away from the translation stages along the Y-axis, and thus has the capability of viewing targets that are separated along the X-axis. The laser interferometer 17 provides a laser beam that is directed downwardly along the Z-axis by a prism 29 to a first beam bender 31 which deflects the beam forwardly along the Y-axis to a second beam bender 31 . which deflects the beam downward along the Z-axis. The downwardly directed beam as deflected by the second beam bender 31 will be reflected by a first surface mirror (element 75 in FIG. 5) to produce a return beam that to returns to the interferometer 17 via the beam benders 33, 31 and the prism 29.

In accordance with conventional interferometer operation, the laser interferometer 17 provides an output that is indicative of extremely small changes in the length of the optical path between the interferometer 17 and the reflecting surface of the first surface mirror 75. As discussed further herein, the output of the interferometer 17 is utilized for measurement of displacement of the interferometer/microscope assembly 20 along the Z axis, and for control of the Z axis translation stage 15 so as to maintain the length of such optical path substantially constant while the interferometer/microscope assembly 20 is translated along the X and Y axes. Since the microscope objective lens 27 and the interferometer 17 are fixedly secured to move as a single unit, the distance between the microscope objective lens 27 and the plane of the reflecting surface of the first surface mirror 75 is also maintained constant with translation of the microscope objective lens 27 along the X-axis and the Y-axis, whereby the objective lens 27 is controlled to move in a plane that is parallel to the plane of reflecting surface of the first surface mirror 75. Stated another way, when the objective lens 27 is moved between two viewing positions, the distance between the microscope objective lens 27 and the reflecting surface of the first surface mirror 75 will be the same at both positions, unless changed for alignment purposes, as discussed further herein. Thus, when the interferometer/microscope assembly 20 is moved from one viewing position to the other, the distance between the objective lens 27 and the reflecting surface of the first surface mirror 75 at the destination viewing position will be the same as the distance between the objective lens and the reflecting surface at the originating viewing position at the time the move was commanded. When the microscope objective lens 27 is at a particular viewing position, its position along the Z-axis can be changed, which will then be maintained when the interferometer/microscope assembly 20 is moved to the other viewing position.

The alignment system further includes a retaining fixture 35 for retaining a partially assembled tape drive that is to be aligned with the alignment system. The retaining fixture 35 includes a fixture base 37, locating pegs 39, and spring biased retaining pegs 41 which firmly hold the tape drive to be aligned against the locating peg 39.

Figure 3:
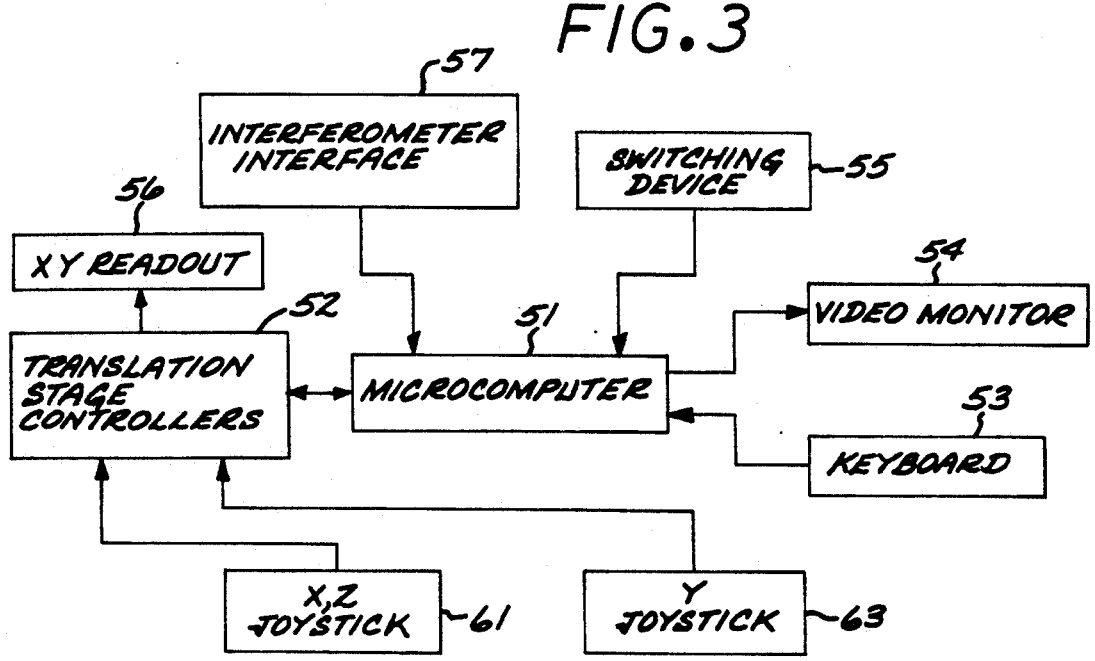
FIG. 3 a schematic block diagram of an illustrative example of the control system of the optical alignment system of FIG. 1.

Referring now to FIG. 3, set forth therein is a block diagram of a control system for controlling the operation of the translation stages 11, 13, 15 in conjunction with head alignment with the optical alignment system. A microcomputer 51 is appropriately programmed to provide control signals to translation stage controllers 52 in response to operator inputs which can be provided via keyboard 53 and/or a switching device 55 such as a mouse. An XY position readout display device 56 receives XY position information from the translation stage controllers 52 and displays operator viewable XY position information. An XZ joystick 61 can be provided for fine control of the X and Z translation stages 11, 15, and a Y joystick 63 can be provided for fine control of the Y translation stage 13. A video monitor 54 displays operator viewable output from the microcomputer 51.

The microcomputer 51 is further responsive to the output of the interferometer 17 as received via an interferometer interface 57, and is configured to measure displacement of the interferometer/microscope assembly 20 along the Z-axis, and also to control the Z-axis translation stage 15 to maintain the optical distance between the first surface mirror 75 and the interferometer 17 substantially constant as the microscope/interferometer assembly 20 is translated along the X and Y axes, whereby the objective lens 27 remains in a plane that is parallel to the reflecting surface of the first surface mirror 75. The microcomputer displays a resettable Z-axis readout on the video monitor 54, which allows for easy determination of displacement along the Z-axis. In particular, the Z-axis position readout will indicate the distance between a first Z-axis position at which the Z-axis position readout is zeroed and a second Z-axis position to which the microscope objective lens 27 has been moved while at a particular viewing position. The Z-axis readout can be reset by an operator input on the keyboard, for example.

For alignment operations, the control system of FIG. 3 includes the capability of positioning the interferometer/microscope assembly 20 at a predetermined home position that allows a partially assembled tape drive to be positioned on the retaining fixture 35. Also, a first nominal position of the interferometer/microscope assembly 20 can be defined for viewing a first target head gap to be used for alignment for a particular drive. A second nominal viewing position can also be defined for viewing a second target head gap, as well as nominal X and Y offsets between the first and second nominal viewing positions. No Z-axis offset is necessary since the interferometer and the microcomputer function to maintain the microscope objective at the same distance from the first surface mirror as the interferometer/microscope assembly is moved from one position to another. The first and second nominal positions take into account the required distance along the Y-axis for nominal focus since the head gaps used of alignment will not necessarily be at the same location along the Y-axis, and also take into account the nominal distance along the X-axis between the head gaps used for alignment. No Z-axis offset is required as between the first and second nominal positions since the microcomputer maintains the microscope objective in a plane parallel to the first surface mirror reflecting surface as the microscope objective is moved from one viewing position to another.

Figure 4:
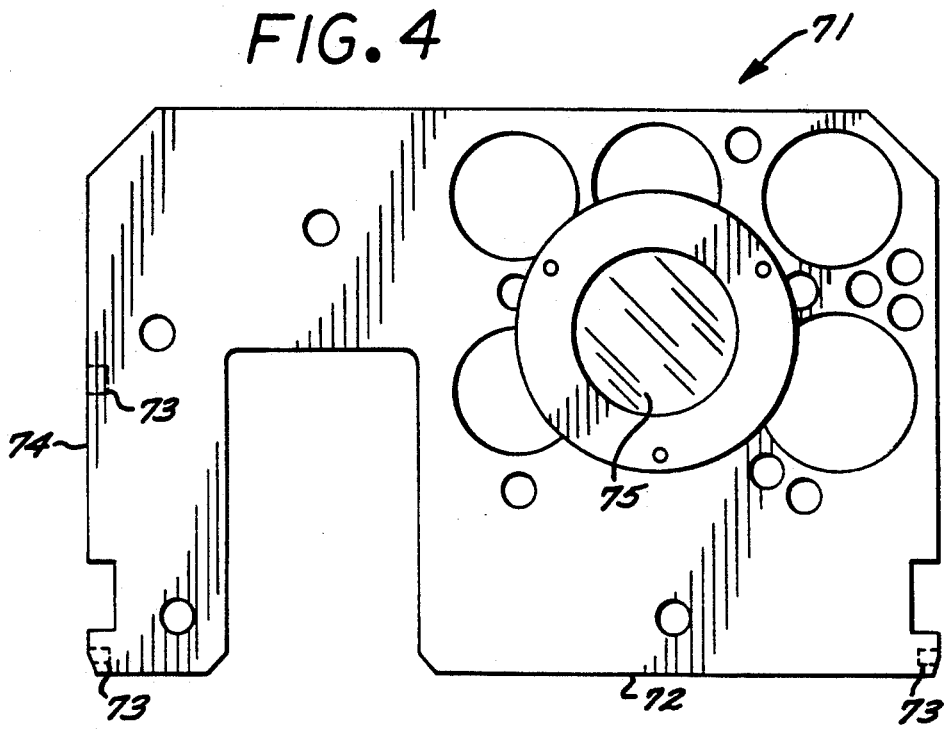
FIG. 4 is a top plan view of an illustrative example of the reference cartridge plate of the optical alignment system of FIG. 1.

Referring now to FIG. 4, schematically illustrated therein is a datum plane locating cartridge plate 71 that is inserted in the drive to be aligned. The cartridge plate 71 emulates a tape cartridge which the drive being aligned is intended to accept, and includes for example reference surfaces 73 on its upper surface that correspond to reference surfaces on the tape cartridge represented. Edges 72, 74 of the cartridge plate 71 correspond to positioning edges of the tape cartridge. The cartridge plate 71 further includes a first surface mirror 75 having a reflecting surface that is configured to be parallel to the datum plane defined by the fixed position locators of a drive when such fixed position locators are engaged with the reference surfaces 73. The first surface mirror 75 is appropriately positioned and sized such that the laser illumination provided by the beam bender 33 will be incident on the first surface mirror 75 for all positions of the microscope objective 27 pertinent to tape head assembly alignment. In particular for the tape drive illustrated, such datum plane will be generally horizontal when the cartridge plate is loaded in the drive.

In addition to emulating the positioning components of the tape cartridge represented, the cartridge plate including the mirror 75 is formed to have substantially the same weight and center of gravity as the tape cartridge it represents.

Figure 5:
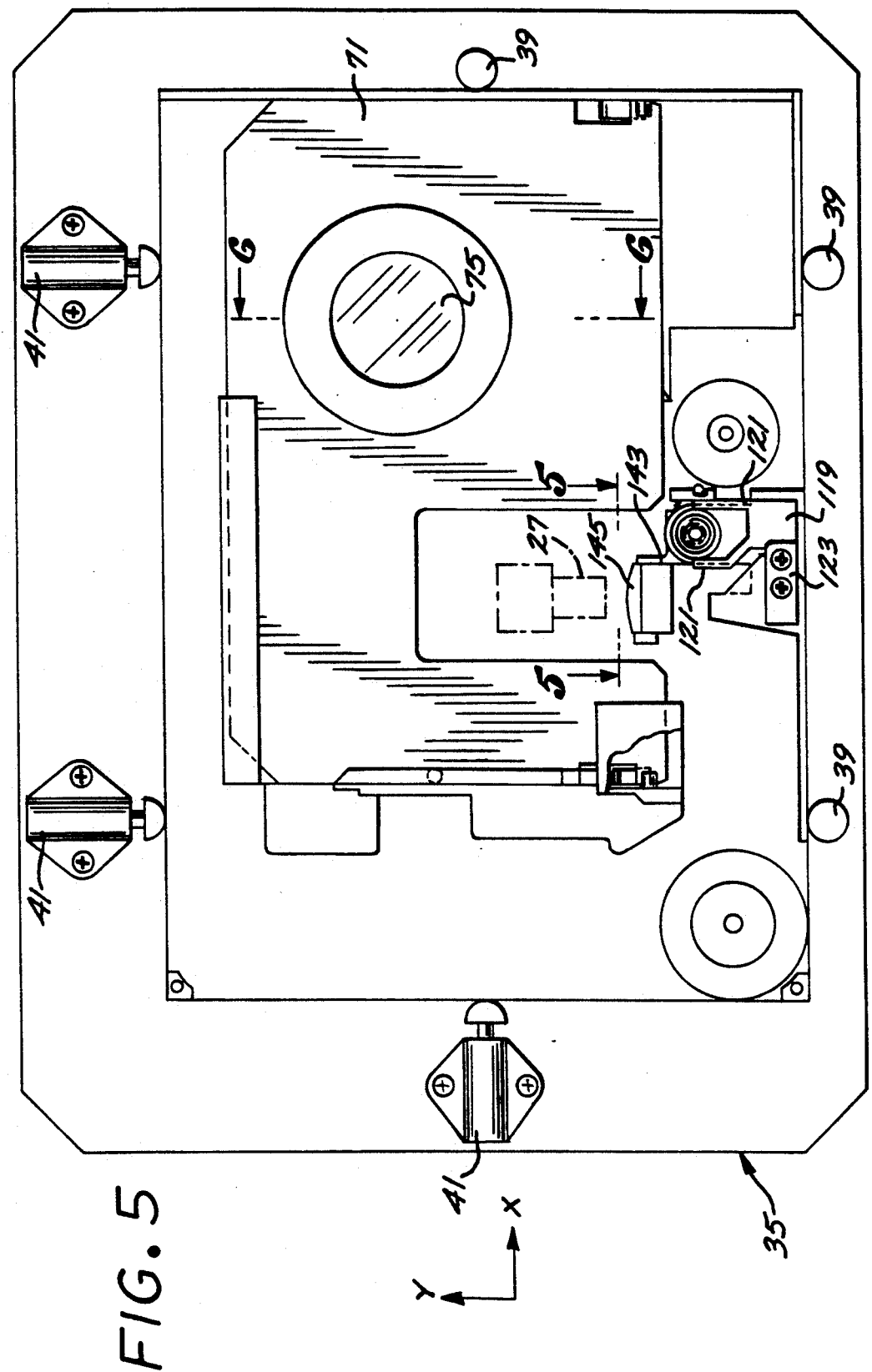
FIG. 5 is a top plan view schematically illustrating a partially assembled tape drive positioned for tape head assembly alignment in the optical alignment system of FIG. 1.

Referring now to FIG. 5, a partially assembled tape drive 70 to be aligned is positioned in the retaining fixture 35, and the datum locating cartridge plate 71 is loaded in the tape drive 70 in the same manner as a tape cartridge, with the reference surfaces 73 positioned in the same manner and locations as the corresponding reference surfaces of the cartridge represented. To the extent necessary, electrical connections are made to the partially assembled tape drive 70 as required for loading the cartridge plate 71.

Figure 6:
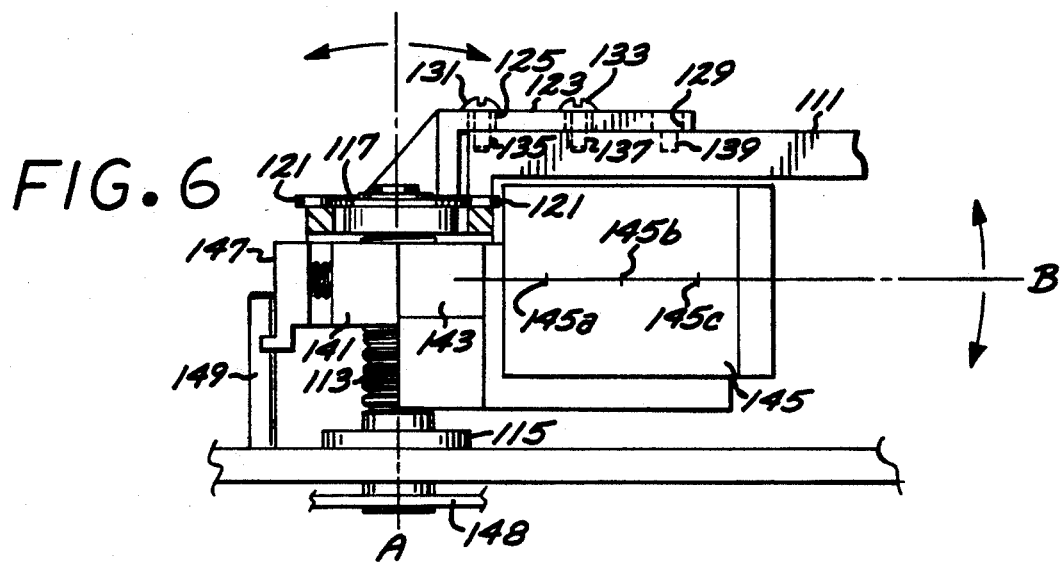
FIG. 6 is an elevational view schematically illustrating the tape head assembly adjustment mechanism of the tape drive shown in FIG. 5.

As shown in plan view in FIG. 5 and in elevational view in FIG. 6, the partially assembled tape drive 70 generally includes a frame 111, a lead screw 113, and lower and upper supports 115, 117 for the lead screw 113. The lower lead screw support 115 is secured to a base plate of the drive frame 111 in a manner that allows for limited pivoting of the lower lead screw support 115 and prevents translation thereof. The upper lead screw support 117 is supported by a flange of the drive frame 111 in a manner that allows for limited translation thereof along the X and Y axes, but prevents displacement thereof along the axis A of the lead screw 113. The lower end of the lead screw includes a shaft that extends below the base plate of the drive frame and supports a flat gear 148 that is driven, for example by a pinion gear (not shown) on the output shaft of a stepper motor (not shown).

The tilt of the lead screw 113 adjustable by means of an L-shaped adjustment bracket 119 that includes parallel projections 121 that extend along the Y-axis and are engaged with the upper lead screw support 117. The adjustment bracket 119 further includes a securing arm 123 that extends along the X-axis and includes three apertures 125, 127, 129. The shafts of locking screws 131, 133 pass through apertures 125, 127 which have a diameter slightly greater than the diameters of the shafts of the screws 131, 133. A flange portion of the drive frame 111 includes threaded holes 135, 137 that correspond to the apertures 125, 127, and a non-threaded hole 139 that corresponds to the aperture 129. The threaded holes 135, 137 and the non-threaded hole 139 are smaller than the corresponding apertures 125, 127, 129, and are arranged such that the center to center spacing of the threaded holes 135, 137 is the same as that of the corresponding apertures 125, 127, while the non-threaded hole 139 is axially misaligned relative to the aperture 129 when the apertures 125, 127 are centered over corresponding threaded apertures 135, 137 in the flange. The end of a tapered adjustment tool (not shown) can be engaged in the hole 139 through the aperture 129 to adjust the position of the adjustment bracket 119 by tilting the adjustment tool against the inside edge of the aperture 129. Adjusting the adjustment bracket 119 changes the tilt of the lead screw 113, as indicated on FIG. 6 by the arrows on either side of the axis A of the lead screw.

A central block 141 having an internally threaded aperture engaged on the lead screw 113 supports an outwardly extending arm 143 which in turn supports a tape head assembly 145 having head gaps 145a, 145b, 145c that are colinear on a line B line and which are schematically represented by short segments since they are too small to be visible on an actual tape head assembly without magnification. An anti-rotation arm 147 is secured to the central block 141 and includes a slot that slidably engages an anti-rotation pin 149 which is nominally parallel to the lead screw 113. The axis of the anti-rotation pin 149 and the nominal axis of lead screw 113 are coplanar in a plane that is parallel to the XZ plane, which substantially limits the tilt adjustment of lead screw to be parallel to the XZ plane. In other words, the displacement of the adjustment bracket 119 will generally be along the X-axis, and such displacement changes the tilt of the line B on which the tape head gaps are colinear.

A particular example of a tape drive having a tape head assembly that is tiltable as described above for alignment with the subject optical alignment system is disclosed in commonly assigned U.S. application Ser. No. 07/546,025, filed Jun. 29, 1990, by Nayak et al., and entitled "GEAR DRIVE CARRIAGE AND STEPPER ADJUSTMENT SYSTEM," incorporated herein by reference.

In operation, the interferometer/microscope assembly 20 can be moved between first and second viewing positions for viewing first and second target head gaps to be utilized for alignment, for example, the two outside gaps 145a, 145b of the tape head assembly 145 shown in FIG. 6. As the assembly 20 moves from one viewing position to another, the microcomputer 51 responds to the output of the interferometer 17 and controls the Z-axis translation stage to maintain the optical distance between the interferometer 17 and the reflecting surface of the first surface mirror 75 constant as the assembly 20 moves between positions, such that the distance between the microscope objective lens 27 and the reflecting surface of the first surface mirror 75 remains constant as the assembly moves from one viewing position to the other. Thus, pursuant to a command for movement from one viewing position to the other, the distance between the microscope objective lens 27 and the plane of the first surface mirror reflecting surface at the destination viewing position will be the same as the distance between the microscope objective and the plane of the first mirror reflecting surface at the originating viewing position at the time the movement command was made.

At each viewing position, the position of the interferometer/microscope assembly 20 can be finely adjusted by actuating the joysticks 61, 63 while viewing the video image which includes a reticle that is in a fixed position in the field of view of the microscope objective lens 27, and the finely adjusted position is stored as the respective first or second viewing position of the assembly 20 for the particular drive being aligned. When aligning a particular drive, the initial first viewing position will be the nominal first position as determined and programmed for the particular drive, and the initial second viewing position will be the position defined by applying predetermined X and Y offsets to the first viewing position as updated by fine position adjustment at the first viewing position. Subsequently, the X and Y coordinates of each viewing position are the X and Y coordinates to which the viewing position was adjusted prior to movement to the other viewing position.

Figure 7:
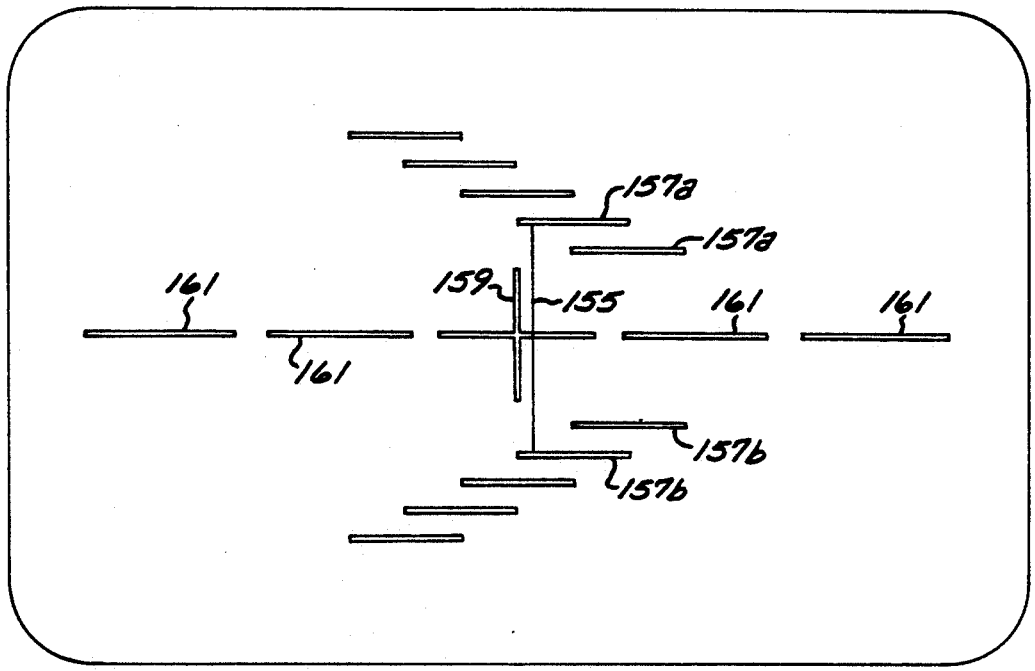
FIG. 7 schematically depicts an example of a head gap image that would be displayed on the video display of the optical alignment system of FIG. 1.

FIG. 7 schematically depicts by way of illustrative example an image that would be displayed on the video monitor 22 when the microscope objective lens 27 is positioned so as to vertically center a target head gap image 155 relative to a reticle that includes a central cross hair 159, horizontal line segments 159 which are colinear with the horizontal line segment of the cross hair 159, upper stepped horizontal lines 157a, and lower stepped horizontal lines 157b which are a mirror image of the upper stepped horizontal lines. An image similar to that of FIG. 7 would be produced, for example, pursuant to fine adjustment of the microscope objective 27 at the first viewing position. As another example, an image similar to that of FIG. 7 would be produced at each of the viewing positions after the tape head assembly of a drive has been aligned with the optical alignment system.

Figure 8:
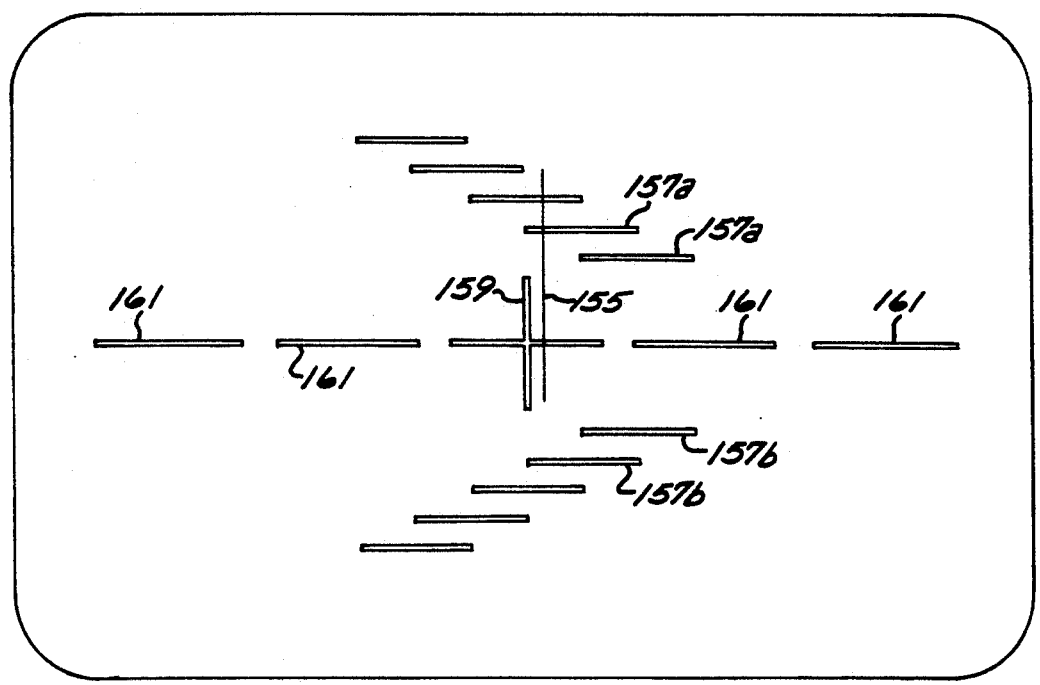
FIG. 8 schematically depicts a further example of a head gap image that would be displayed on the video display of the optical alignment system of FIG. 1.

FIG. 8 schematically depicts by way of illustrative example an image that would be displayed on the video display when a target head gap image 155 is not vertically centered between the stepped horizontal lines 157a, 157b of the reticle. An image similar to that of FIG. 8 would be produced, for example, pursuant to moving the objective lens 27 to one viewing position from the other viewing position at which the head gap image had been centered for a tape head assembly that is not aligned. That is, if a tape head assembly is not aligned and the image of the target head gap at an originating viewing position is vertically centered, the image of the other target head gap at the destination viewing position will not be vertically centered when the microscope objective lens 27 is moved to the destination viewing position. In this manner, the deviation along the Z-axis of the head gap image at the destination viewing location indicates the amount of misalignment of the tape head assembly, since the microscope objective lens 27 had been moved in a plane parallel to the plane of the first surface mirror 75 reflecting surface which is parallel to the reference plane, and the reticle has been effectively moved in a plane parallel to the reference plane.

It should be appreciated that while FIGS. 7 and 8 depict only a head gap, actual images can include other noticeable characteristics such as horizontally extending lamination layers that may be above and below a head gap.

Pursuant to the visual misalignment information provided by the images of the first and second target head gaps, the position of the tape head assembly is adjusted by adjusting the adjustment bracket 119 until the first and second target head gaps are at the same distance from the datum plane. Such adjustment may involve iterative tape head assembly position adjustment and movement between the updated first and second microscope objective positions. When the tape head assembly is aligned, the images produced at the two viewing positions would be similar to that of FIG. 7.

The foregoing has been a disclosure of an optical alignment system that optically detects a reference plane for the particular drive being aligned, which provides for increased accuracy and reliability of alignment, and does not rely on the accuracy of locating the drive.

Although the foregoing has been a description and illustration of specific embodiments of the invention, various modifications and changes thereto can be made by persons skilled in the art without departing from the scope and spirit of the invention as defined by the following claims.

What is claimed is:

1. An optical alignment system for aligning a multiple gap tape head assembly of a tape drive having fixed position locators that define a reference plane, comprising:

reference means insertable in the tape drive for defining an optical reference plane that is parallel the reference plane when the reference means is inserted in the tape drive and engaged with the fixed position locators;

imaging means for providing images of the head gaps of the multiple gap tape head assembly;

optical detection means fixedly secured to said imaging means for detecting changes in the distance between said optical detection means and said optical reference plane;

means for moving said imaging means and said optical means;

controlling means responsive to said optical detection means for controlling said moving means to maintain said optical detection means at a constant distance relative to said optical reference plane as said moving means moves said imaging means and optical detection means from one position to another, whereby said imaging means moves in a plane that is parallel to said reference plane, and misalignment of the tape head assembly is detectable from the images of the head gaps.

2. The optical alignment system of claim 1 wherein:

said reference means comprises a cartridge plate that emulates a tape cartridge and a reflecting surface secured to the cartridge plate, said reflecting surface being parallel to the reference plane when said cartridge plate is installed in the tape drive; and said optical detection means comprises a laser interferometer.

3. The optical alignment system of claim 2 wherein said imaging means comprises a microscope.

4. An optical alignment system for aligning a multiple gap tape head assembly of a tape drive having fixed position locators that define a reference plane, comprising:

reference means insertable in the tape drive for defining an optical reference plane that is parallel the reference plane when the reference means is inserted in the tape drive and engaged with the fixed position locators;

means for imaging the head gaps of the multiple gap tape head assembly;

display means responsive to said imaging means for providing an operator viewable display of the images provided by said imaging means;

optical detection means fixedly secured to said imaging means for detecting changes in the distance between said optical detection means and said optical reference plane;

means for moving said imaging means; and controller means responsive to said optical detection means for controlling said moving means to maintain said optical detection means at a constant distance relative to said optical reference plane as said moving means moves said imaging means and optical detection means from one position to another, whereby said imaging means moves in a plane that is parallel to said reference plane, and misalignment of the tape head assembly is detectable from the operator viewable images of the head gaps.

5. The optical alignment system of claim 4 wherein:

said reference means comprises a cartridge plate that emulates a tape cartridge and a reflecting surface secured to the cartridge plate, said reflecting surface being parallel to the reference plane when said cartridge plate is installed in the tape drive; and said optical detection means comprises a laser interferometer.

6. The optical alignment system of claim 5 wherein said imaging means comprises a microscope.

7. An optical alignment system for aligning a multiple gap tape head assembly of a tape drive having fixed position locators that define a reference plane, comprising:

a reference plate having a reflecting surface configured to be parallel to the reference plane when the reference plate is inserted in the tape drive and engaged with the fixed position locators;

an imaging lens for providing images of the head gaps of the multiple gap tape head assembly;

video means responsive to said imaging lens for providing an operator viewable display of the output of said imaging lens;

an interferometer fixedly secured relative to said imaging lens so as to be movable therewith, and cooperating with said reflecting surface for providing information indicative of change in the distance between said interferometer and said reference plane;

means for moving said imaging lens; and controller means responsive to said interferometer for controlling said moving means to maintain said interferometer at a constant distance relative to said reflecting surface as said moving means moves said imaging lens and interferometer from one position to another, whereby said imaging lens moves in a plane that is parallel to said reference plane, and misalignment of the tape head assembly is detectable from the operator viewable images of the head gaps.

8. A method for aligning a multiple gap tape head assembly of a tape drive having fixed position locators that define a reference plane in the ate drive, the method comprising the steps of:

(a) positioning an imaging lens at a first imaging position adjacent a first selected one of the tape head gaps to produce an image of the first selected tape head gap;

(b) moving the imaging lens to a second imaging position adjacent a second selected one of the tape head gaps to produce an image of the second selected tape head gap;

(c) continuously optically detecting the distance between the imaging lens and the reference plane as the imaging lens is moved from the first viewing position to the second viewing position;

(d) maintaining the distance between the imaging lens and the reference plane substantialy constant pursuant to the continuous detection of such distance as the imaging lens is moved from the first viewing position to the second viewing position, whereby the imaging lens is maintained in a plane parallel to the reference plane as it is moved from the viewing position to the second viewing position; and (e) adjusting the tape head assembly pursuant to the images of the first and second selected tape head gaps.

9. The method of claim 8 wherein the step of continuously optically detecting the distance between the imaging lens and the reference plane includes the step of detecting the distance between (a) an interferometer fixedly secured relative to the imaging lens and (b) a reflecting surface that is parallel to the reference plane.

10. A method for aligning a multiple gap tape head assembly of a tape drive having fixed position locators that define a reference plane in the tape drive, the method comprising the steps of:
  (a) providing a reflecting surface on the tape drive that is parallel to the reference plane;
  (b) providing an imaging lines that is movable between first and second selected tape head gaps for providing respective images of the first and second selected head gaps;
  (a) providing an interferometer that is fixedly secured relative to the imaging lens;
  (b) positioning the imaging lens at a first position adjacent the first selected tape head gap to produce an image of the first selected tape head gap;
  (c) moving the imaging lens to a second position adjacent the second selected tape head gap to produce an image of the second selected tape head gap;
  (d) detecting the distance between the interferometer fixedly secured relative to the imaging lens and the reflecting surface that is parallel to the reference plane as the imaging lens is moved from the first position to the second position;
  (h) maintaining the distance between the interferometer and the reflecting surface substantially constant pursuant to the detection of such distance as the imaging lens is moved from the first position to the second position, whereby the imaging lens is maintained in a plane parallel to the reference plane as it is moved from the first viewing position to the second viewing position; and
  (i) adjusting the tape head assembly pursuant to the images of the first and second selected tape head gaps.

* * * * *

UNITED STATES PATENT AND TRADEMARK OFFICE
CERTIFICATE OF CORRECTION

PATENT NO. : 5,257,091  
DATED : 10/26/93  
INVENTOR(S) : Gustavo Caicedo, Jr. et al Page 1 of 4

It is certified that error appears in the above-indentified patent and that said Letters Patent is hereby corrected as shown below:

Column 2, line 50, after "FIG. 1", insert --is--.

Column 2, line 51, delete "an".

Column 2, line 58, after "FIG. 3", insert --is--.

Column 4, line 1, delete the first instance of "to".

Column 5, line 37, delete "of" and insert therefor --for--.

Column 6, line 33, after "113" insert --is--.

UNITED STATES PATENT AND TRADEMARK OFFICE
CERTIFICATE OF CORRECTION

PATENT NO. : 5,257,091          Page 2 of 4
DATED      : 10/26/93
INVENTOR(S) : Gustavo Caicedo, Jr. et al It is certified that error appears in the above-indentified patent and that said Letters Patent is hereby corrected as shown below:

```
Column 3, line 41, after
"stage", insert --11--.

Column 4, line 48, "peg"
should be --pegs--.

Column 4, line 60, "XZ"
should be --XY--.

Column 4, line 61, "X and Z"
should be --X and Y--.

Column 4, line 62, "15"
should be --13--.

Column 4, line 62, "Y" should
be --Z--.

Column 4, line 63, "Y" should
be --Z--.

Column 4, line 63, "13"
should be --15--.

Column 6, line 29, after
"frame" insert --111--.

Column 7, line 47, "63"
should be --62--.
```

UNITED STATES PATENT AND TRADEMARK OFFICE
CERTIFICATE OF CORRECTION

PATENT NO. : 5,257,091
DATED : 10/26/93
INVENTOR(S) : Gustavo Caicedo, Jr. et al It is certified that error appears in the above-indentified patent and that said Letters Patent is hereby corrected as shown below:

Claim 1, column 9, line 14, "controlling" should be --controller--.

Claim 8, column 10, line 38, "ate" should be --tape--.

Claim 8, column 10, line 58, after "from the", insert --first--.

Claim 10, column 11, line 7, "lines" should be --lens--.

Claim 10, column 11, line 12, "(a)" should be --(c)--.

Claim 10, column 11, line 14, "(b)" should be --(d)--.

Claim 10, column 11, line 17, "(c)" should be --(e)--.

Claim 10, column 12, line 3, "(d)" should be --(f)--.

UNITED STATES PATENT AND TRADEMARK OFFICE
CERTIFICATE OF CORRECTION

PATENT NO. : 5,257,091
DATED : 10/26/93
INVENTOR(S) : Gustavo Caicedo, Jr. et al It is certified that error appears in the above-indentified patent and that said Letters Patent is hereby corrected as shown below:

Claim 10, column 12, line 8,
"(h)" should be --(g)--.

Claim 10, column 12, line 16,
"(i)" should be --(h)--.

Signed and Sealed this

Nineteenth Day of July, 1994

Attest:

BRUCE LEHMAN

*Attesting Officer*  *Commissioner of Patents and Trademarks*